United States Patent
Shiomi et al.

(10) Patent No.: US 9,748,883 B2
(45) Date of Patent: Aug. 29, 2017

(54) CONTROL DEVICE FOR ROTATING ELECTRICAL MACHINE

(71) Applicant: DENSO CORPORATION, Kariya, Aichi-pref. (JP)

(72) Inventors: Kazutoshi Shiomi, Kariya (JP); Hideaki Nakayama, Kariya (JP); Kiyoshi Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/018,273

(22) Filed: Feb. 8, 2016

(65) Prior Publication Data

US 2016/0248359 A1 Aug. 25, 2016

(30) Foreign Application Priority Data

Feb. 25, 2015 (JP) ................... 2015-035618

(51) Int. Cl.
*H02P 21/00* (2016.01)
*H02P 25/022* (2016.01)
*H02P 9/08* (2006.01)

(52) U.S. Cl.
CPC .............. *H02P 25/022* (2013.01); *H02P 9/08* (2013.01)

(58) Field of Classification Search
CPC .................................. H02P 25/02; H02P 9/08
USPC ..................................................... 318/400.02
See application file for complete search history.

(56) References Cited

U.S. PATENT DOCUMENTS

| | | | |
|---|---|---|---|
| 2004/0080291 A1 | 4/2004 | Inoue et al. | |
| 2009/0026999 A1* | 1/2009 | Atarashi | B60L 15/025 318/720 |
| 2009/0071735 A1* | 3/2009 | Kaneko | B60K 6/26 180/65.285 |
| 2011/0304235 A1* | 12/2011 | Hashiba | H02K 1/02 310/156.76 |

FOREIGN PATENT DOCUMENTS

JP 2004-144019 A 5/2004

* cited by examiner

*Primary Examiner* — Erick Glass
(74) *Attorney, Agent, or Firm* — Oliff PLC (57) ABSTRACT

A rotating electrical machine has a rotor having a field winding and a stator having an armature winding. A control device adjusts a field current flowing in the field winding and an armature current flowing in the armature winding. The armature current flowing in the armature winding is expressed by using a current vector having a d-axis current and a q-axis current in a d-q coordinate system. In a case in which the control device increases the d-axis current to generate a magnetic flux in a direction which is opposite to a direction to generate a magnetic flux by a field current, the control device gradually reduces the d-axis current during a predetermined period of time after increasing the d-axis current in the direction opposite to the direction to generate the magnetic flux by the field current.

11 Claims, 6 Drawing Sheets

CONTROL DEVICE FOR ROTATING ELECTRICAL MACHINE

CROSS-REFERENCE TO RELATED APPLICATION

This application is related to and claims priority from Japanese Patent Application No. 2015-35618 filed on Feb. 25, 2015, the contents of which are hereby incorporated by reference.

BACKGROUND OF THE INVENTION

1. Field of the Invention

The present invention relates to control devices for rotating electrical machines of a field winding type, which is capable of controlling the operation of the rotating electrical machine.

2. Description of the Related Art

In addition to an internal combustion engine, a rotating electrical machine of a field winding type is mounted on a motor vehicle capable of having both functions of an alternator and an electric motor. The alternator generates regenerative electric power. The electric motor generates and outputs a torque to be used for staring the internal combustion engine of the motor vehicle.

The field winding of such a rotating electrical machine having the functions of the alternator and the electric motor has a large time constant of a field current. That is, a long period of time is required for the rotating electric machine of a field winding type in order to increase a field current of the field winding thereof to an adequate value. Accordingly, the rotating electric machine of a field winding type has a low responsiveness to a requested torque.

In order to solve the conventional problem previously described, a patent document, Japanese patent laid open publication No. 2004-144019, discloses a rotating electrical machine having a structure in which an armature current flows in an armature winding in order to generate a magnetic flux, in a direction which is opposite to a field flux of the field current simultaneously or before the supply of the field current and eliminates a self-inductance of the field winding, and in order to perform electromagnetic induction in a direction to increase the field current.

Since the d-axis current has a low influence on an output torque of the rotating electric machine, the continuous flow of the d-axis current causes wastage of electrical power. The patent document 1 shows no suggestion to solve a problem caused by such a continuous flow of the d-axis current in the armature winding.

SUMMARY

It is therefore desired to provide a control device for a rotating electrical machine capable of solving the conventional problem such as occurrence of wastage of electrical power previously described caused by continuous flow of a d-axis current in an armature winding when the d-axis current is supplied to the armature winding in order to generate a magnetic flux in a direction opposite to a magnetic flux caused by a field current.

An exemplary embodiment provides a control device for a rotating electrical machine. The control device is capable of controlling operation of a rotating electrical machine. The rotating electrical machine has a rotor having a field winding and a stator having an armature winding. The control device controls, i.e. adjusts, a field current which flows in the field winding and an armature current which flows in the armature winding. The armature current which flows in the armature winding is expressed by using a current vector. The current vector is comprised of a d-axis current and a q-axis current in a d-q coordinate system. The control device increases the d-axis current in a direction to generate a magnetic flux opposite to a direction of a magnetic flux generated by a field current.

In a case in which the field current starts to increase due to the increasing of the torque instruction value to be supplied to the rotating electrical machine, the control device gradually reduces the d-axis current for a predetermined period of time after increasing the d-axis current in the direction to generate the field current which is opposite to a direction to generate a magnetic flux by the field current.

The control device has the structure and behavior previously described and will be explained in detail in the following description. The control device can improve the responsiveness of the field current by using the d-axis current. Further, the control device controls the d-axis flows to start to supply the d-axis current after the field current of the field winding is increased. This control makes it possible to provide an overall increased amount of the d-axis current to the induced current in the field winding. Still further, the control device can reduce wastage of electrical power because the d-axis current is firstly increases and then decreased. That is, when the d-axis current is reduced, the field current is reduced by the induced current which corresponds to the d-axis current. The reduction of the field current reduces the responsiveness of the field current and provides a problem. In order to avoid this problem, the control device gradually reduces the d-axis current in order to suppress the decreasing of the field current caused by the induced current, and further suppress the reduction of the responsiveness of the field current. As previously explained, the control device having the improved structure previously described makes it possible to eliminate the problem caused by the d-axis current which flows in the armature winding.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a control device 40 for a rotating electrical machine 10 according to a preferred exemplary embodiment with reference to FIG. 1 to FIG. 7A, FIG. 7B and FIG. 7C.

In the exemplary embodiment, the control device and the rotating electrical machine are mounted to a motor vehicle (not shown) having an internal combustion engine (hereinafter, engine). The rotating electrical machine is an in-vehicle main machine.

Figure 1:
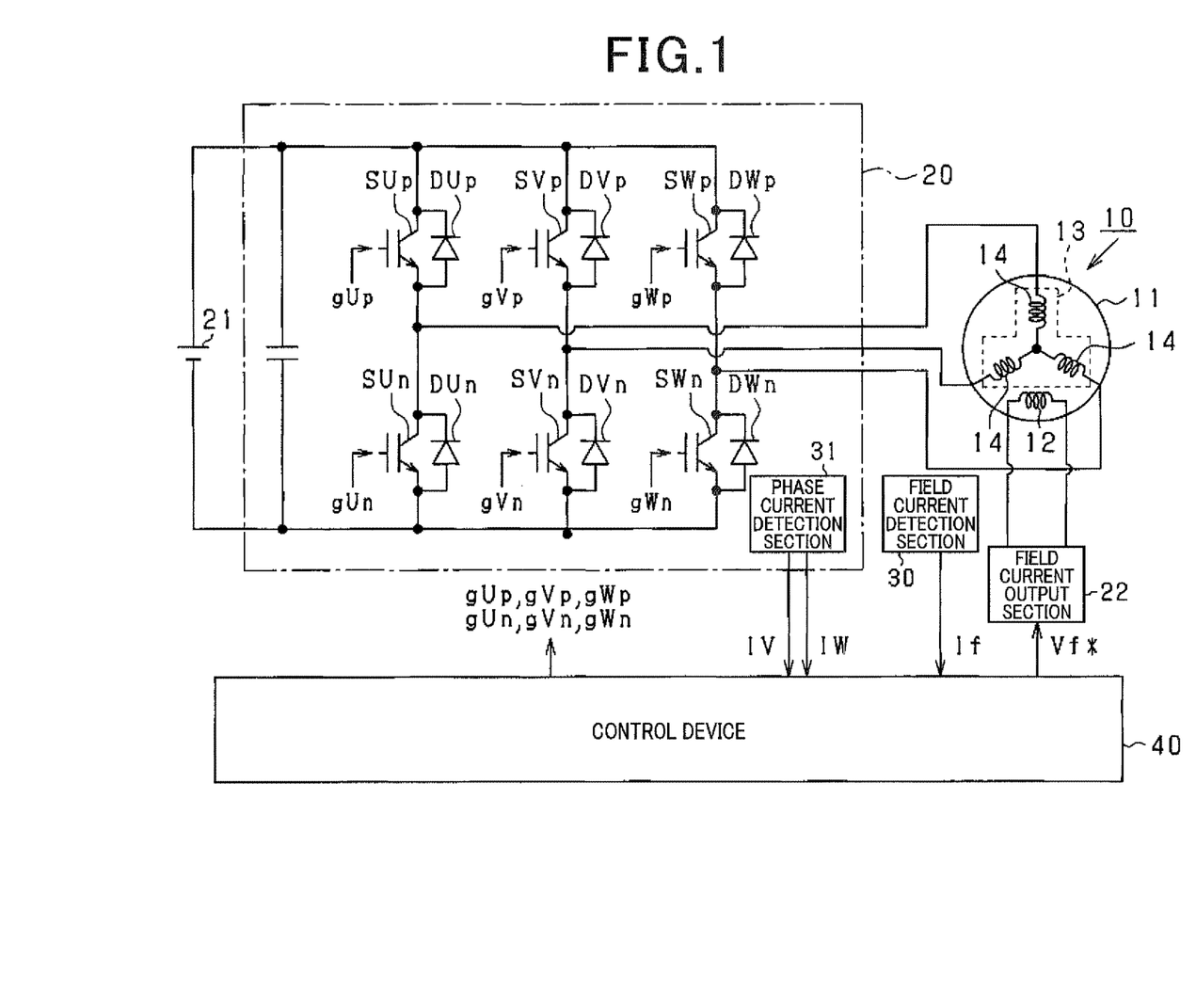
FIG. 1 is a view showing a circuit diagram of a control system having a control device capable of adjusting the operation of a rotating electrical machine according to an exemplary embodiment of the present invention.

FIG. 1 is a view showing a circuit diagram of a control system having the control device 40 capable of controlling the operation of the rotating electrical machine 10 according to the exemplary embodiment. As shown in FIG. 1, the rotating electrical machine 10 is a field winding type having multiple phase windings. Specifically, the rotating electrical machine 10 shown in FIG. 1 is a field winding synchronous rotating machine having three phase windings.

The present exemplary embodiment uses an integrated starter generator (ISG) as the rotating electrical machine 10. The integrated starter generator functions as both a starter and an alternator. In particular, the rotating electrical machine 10 according to the exemplary embodiment acts as the starter when the engine of the motor vehicle initially starts, and restarts the engine of the motor vehicle after an idling automatic stop operation. The idling automatic stop operation automatically stops the operation of the engine of the motor vehicle when a predetermined automatic engine stop condition is satisfied, and automatically restarts the engine when a predetermined automatic engine restart condition is satisfied.

The rotating electrical machine 10 has a rotor 11 (i.e. armature) and a stator 13. The rotor 11 has a field winding 12 and is connected (i.e. directly connected) to a crank shaft of the engine. Through the crank shaft, the rotation power is transmitted between the rotor 12 and the engine. An armature winding 14 is wound on the stator 13. The armature winding 14 is composed of three phase windings which are connected to a common neutral point (Y connection) shown in FIG. 1.

The armature winding 14 of the rotating electrical machine 10 is connected to an inverter 20. The inverter 20 is connected to a direct current power source 21. The inverter 20 has a three pairs of high voltage side switching elements SUp, SVp and SWp of U, V and W phases and low voltage side switching elements SUn, SVn and SWn of the U, V and W phases. The high voltage side switching element and the low voltage side switching element in each pair form a series connection part. A connection node of the series connection part of the U phase is connected to a U phase terminal of the armature winding 14. A connection node of the series connection part of the V phase is connected to a V phase terminal of the armature winding 14. A connection node of the series connection part of the W phase is connected to a W phase terminal of the armature winding 14.

In the inverter 20 shown in FIG. 1, each of the high voltage side switching elements SUp, SVp, SWp and the low voltage side switching elements SUn, SVn and SWn in the U, V and W phases is an N channel MOS FET (N channel metal oxide semiconductor field effect transistor). Further, the high voltage side switching elements SUp, SVp and SWp and the low voltage side switching elements SUn, SVn and SWn have freewheel diodes DUp to DWn, respectively. Instead of using the freewheel diodes DUp to DWn, it is also possible to use a body diode of each of the high voltage side switching elements SUp, SVp and SWp and the low voltage side switching elements SUn, SVn and SWn. Further, it is also acceptable to use an IGBT (Insulated Gate Bipolar Transistor) instead of using MOSFETs for each of the high voltage side switching elements SUp, SVp and SWp and the low voltage side switching elements SUn, SVn and SWn.

As shown in FIG. 1, a positive electrode terminal of the direct current power source 21 is connected to a high voltage side terminal of the inverter 20. The high voltage side terminal of the inverter 20 is a drain-side terminal of each of the high voltage side switching elements SUp, SVp and SWp. A negative electrode terminal of the direct current power source 21 is connected to a low voltage side terminal of the inverter 20. The low voltage side terminal of the inverter 20 is a source-side terminal of each of the low voltage side switching elements SUn, SVn and SWn.

A field current output section 22 supplies a direct current voltage of the direct current power source 21 to the field winding 12. The field current output section 22 controls, i.e. adjusts a field voltage VF to be supplied to the field winding 12 by using the direct current electric power supplied from the direct current power source 21 in order to adjust the field current If flowing in the field winding 12. As previously described, the same amount of electric power of the direct current power source 21 is supplied to the armature winding 14 and the field winding 12.

The control device 40 receives a detection signal of the field current If transmitted from a field current detection section 30. The control device 40 calculates an operation value on the basis of the received detection signal of the field current If in order to perform the feedback operation of the field current If to a field current instruction value If*. This operation value is a field voltage instruction value Vf* as an instruction value of the field voltage Vf to be supplied to the field winding 12. The control device 40 according to the exemplary embodiment shown in FIG. 1 performs proportional integral derivative control (PID control) on the basis of a difference between an actually-detected field current If and the field current instruction value If* in order to calculate the field voltage instruction value Vf*.

Further, the control device 40 calculates a d-axis current instruction value Id* and a q-axis current instruction value Iq* on the basis of a torque instruction value T* and a rotation angular velocity ω. This d-axis current instruction value Id* is an instruction value regarding the d-axis current Id, and the q-axis current instruction value Iq* is an instruction value regarding the q-axis current Iq. The d-axis current Id and the q-axis current Iq are elements of a current vector composed of a d-axis current and a q-axis current in a d-q axis coordinate system.

The control device 40 generates operation signals gUp to gWn on the basis of the d-axis current instruction value Id* and the q-axis current instruction value Iq*. More specifically, the control device 40 calculates instruction voltages VU*, VV* and VW* of each of the U, V and W phases on the basis of the d-axis current instruction value Id*, the q-axis current instruction value Iq* and the detection values of phase currents IV and IW transmitted from a phase current detection section 31. The control device 40 generates the operation signals gUp to gWn by the PWM process on the basis of a comparative difference of the instruction voltage VU*, VV* and VW* and a carrier signal tp (which is a triangle wave signal, for example.)

The control device 40 outputs the generated operation signals gUp to gWn to the inverter 20. This operation makes it possible to supply a voltage of a sine wave to each of the phase windings of the U, V and W phases in the armature winding 14. The voltage of a sine wave to be supplied to each of the U, V and W phases is different by 120° to each other.

The output torque T of the rotating electrical machine 10 of a field winding type is designated by the following equation:

$$T=Pn\{(\phi a \cdot Iq+(Ld-Lq)Id \cdot Iq\},$$

where Pn indicates the number of pole pairs of the rotor 11, φa indicates a field flux, Iq indicates a q-axis current, Ld indicates a d-axis inductance, and Lq indicates a q-axis inductance.

Similar to a surface permanent magnet motor (SPM motor), it can be recognized that the d-axis inductance is equal to the q-axis inductance in the rotating electrical machine 10 of a field winding type. Accordingly, the output torque T of the rotating electrical machine 10 of a field winding type can be expressed by the following equation:

$$T=Pn \cdot \Phi a \cdot Iq.$$

Since the rotating electrical machine 10 of a field winding type satisfies the equation of φa=Lf. If, the output torque T of the rotating electrical machine 10 can be expressed by the following equation:

$$T=Pn \cdot If \cdot Iq,$$

where Lf indicates a field inductance and If indicates a field current.

That is, it can be understood to adjust the output torque T of the rotating electrical machine 10 by correctly adjusting the field current If and the q-axis current Iq.

Figure 2:
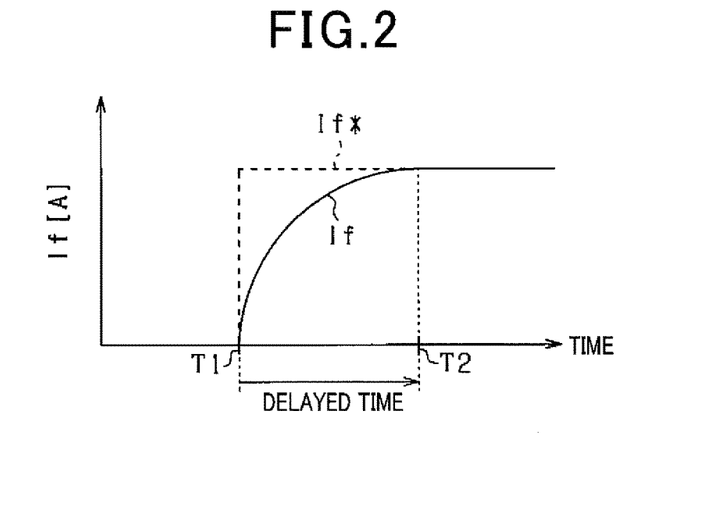
FIG. 2 is a view showing a relationship between a field current instruction value If* and an actual value of a field current If of a field winding in the rotating electrical machine shown in FIG. 1.

FIG. 2 is a view showing a relationship between the field current instruction value If* and an actual value of the field current If. The field current If as the input value of the field winding 12 is determined on the basis of the field current instruction value If*. FIG. 2 shows a delay time of the field current If. That is, when the control device 40 increases the torque instruction value T* at the time T1, the field current instruction value If* is increased stepwise. The control device 40 increases the torque instruction value T* when the engine is restarted or the engine is driven by a supplemental operation.

A self-inductance of the field winding 12 is larger than inductances Ld and Lq of the armature winding 14, and a time constant of the field winding 12 becomes large. For this reason, a delay occurs until the time T2 when the field current If reaches the field current instruction value If*. This causes a problem of deterioration of a torque responsiveness.

The control device 40 according to the exemplary embodiment changes the timing of the d-axis current Id in order to vary the d-axis magnetic flux φd which is generated by the d-axis inductance. When the d-axis magnetic flux φd is varied by the timing change of the d-axis current Id, electromagnetic induction occurs in the field winding 12. This generates the induction current ΔIf in the same as the direction of the field current If.

Figure 3:
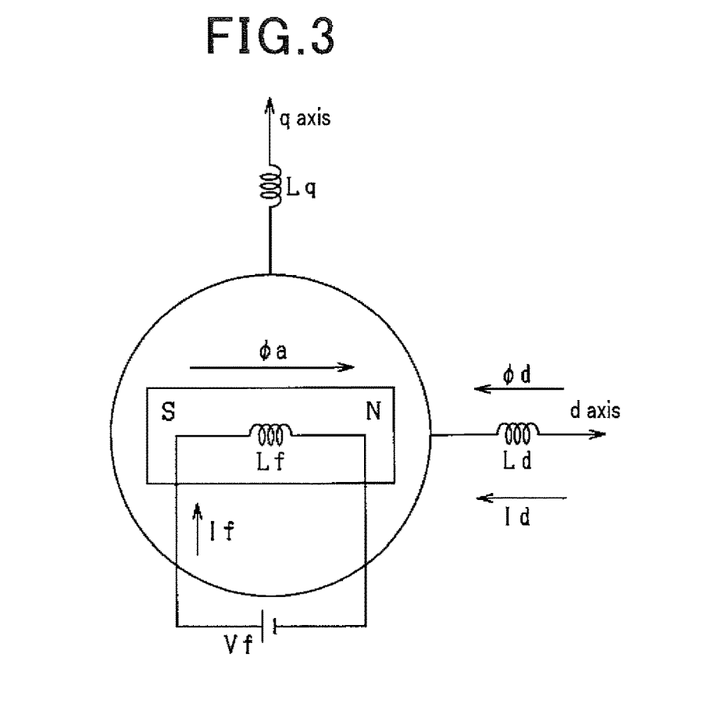
FIG. 3 is a view showing a d-q axis model of the rotating electrical machine shown in FIG. 1.

FIG. 3 is a view showing a d-q axis model of the rotating electrical machine 10 shown in FIG. 1. The field flux φa is generated based on the self-inductance Lf of the field winding 12, and the d-axis magnetic flux φd is generated based on the d-axis inductance Ld.

When the d-axis current Id is varied, the amount D (φd) of timing change of the d-axis magnetic flux φd generated in the d-axis inductance is designated by the following equation:

$$D(\phi d)=D(Ld \cdot Id)=Ld \cdot D(Id),$$

where D is a differential operator (d/dt).

The timing change amount D(φd) of the d-axis magnetic flux φd can be expressed by the following equation:

$$D(\phi d)=k \cdot D(\phi d),$$

where k indicates a coupling coefficient of the self-inductance Lf of the field winding 12 and the d-axis inductance Ld of the armature winding 14.

An induced voltage Vm generated in the field winding 12 can be expressed by the following equation:

$$Vm=-D(\phi a)=-k \cdot D(\phi d)=-k \cdot Ld \cdot D(\phi d).$$

An induced current ΔIf generated by the induced voltage Vm can be expressed by the following expression:

$$\Delta If=Vm/Zf=-k \cdot Ld/Zf \cdot D(Id).$$

The delay of the field current If can be eliminated by generating a positive induced current ΔIf in the same as the direction (in a positive direction) of the field current If. In order to allow the field current If to flow in the positive direction, it is sufficient to supply a negative differential value D (Id) of the d-axis current Id. That is, it is possible to increase the field current If by increasing the d-axis current Id which flows in the same as the direction of the d-axis magnetic flux φd which is opposite to the direction of the magnetic flux φa generated by the field current If. It is possible to generate the induced current ΔIf effectively by increasing sharply the d-axis current Id. Accordingly, the control device 40 according to the exemplary embodiment increases the d-axis current Id stepwise in the direction to generate the magnetic flux φd which is opposite from the direction of the magnetic flux φa generated in the field winding 12.

Because the d-axis current Id provides small influence to the output torque T of the rotating electrical machine 10, the continuous increasing of the d-axis current Id promotes, i.e. increases wastage of electrical power. In order to avoid this drawback, the control device 40 according to the exemplary embodiment increases the d-axis current Id and then decreases the d-axis current Id. The induced current ΔIf is generated in the direction which is opposite to the direction of the field current If when the d-axis current Id is reduced. The control device 40 according to the exemplary embodiment gradually decreases the d-axis current Id during a predetermined period of time in order to suppress the induced current ΔIf which flows in the direction opposite to the direction of the field current If.

Figure 4:
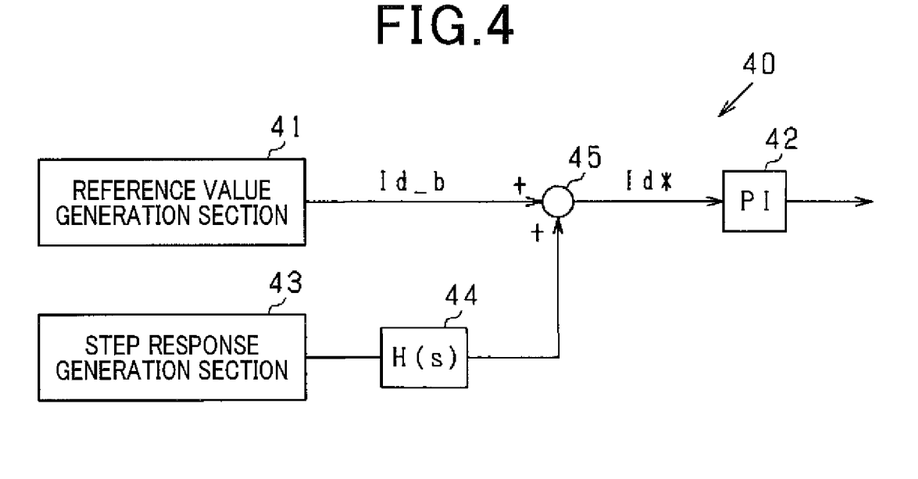
FIG. 4 is a view showing functional blocks of the control device for the rotating electrical machine according to the exemplary embodiment of the present invention shown in FIG. 1.

FIG. 4 is a view showing functional blocks of the control device 40 for the rotating electrical machine 10 according to the exemplary embodiment shown in FIG. 1.

As shown in FIG. 4, a reference value generation section 41 generates a d-axis current reference value Id_b to be used in the vector control on the basis of the rotation angular velocity ω of the rotor 11, the torque instruction value T* and the field current instruction value If*.

A step response generation section 43 generates and outputs a step function of an amplitude λd when the field current instruction value If* is increased. The amplitude λd is the amplitude of the d-axis current. That is, the step response generation section 43 outputs the step function of the amplitude λd of the d-axis current to a high pass filter 44. A transfer function of the high pass filter 44 can be expressed by τs/(1+τs).

When receiving the step function transmitted form the step response generation section 43, the high pass filter 44 generates an attenuation signal having a time constant τ which is attenuated exponentially. It has bene determined in advance that the time constant τ of the high pass filter 44 is larger than the time constant of the field winding 12.

An addition section 45 shown in FIG. 4 adds the d-axis current reference value Id_b transmitted from the reference value generation section 41 and an output value of the high pass filter 44, and outputs the d-axis current instruction value Id*.

A PI (proportional integral) calculation section 42 shown in FIG. 4 performs a PI calculation of a deviation between the d-axis current instruction value Id* transmitted from the addition section 45 and the detection value of the d-axis current.

The PI calculation section 42 generates a target value Vd* of the d-axis voltage by the PI calculation, and outputs the target value Id* of the d-axis voltage to a coordination converter (not shown). The coordination converter receives the target value Id* of the d-axis voltage, and converts the received target value Id* in a d-q coordinate system to the target value Id* in a U V W coordinate system. A PWM converter (not shown) generates a duty of each of the switching elements SUp to SWn on the basis of the target voltage Vu*, Vv* and Vw* of each of the U, V and W phases.

Figure 5A:
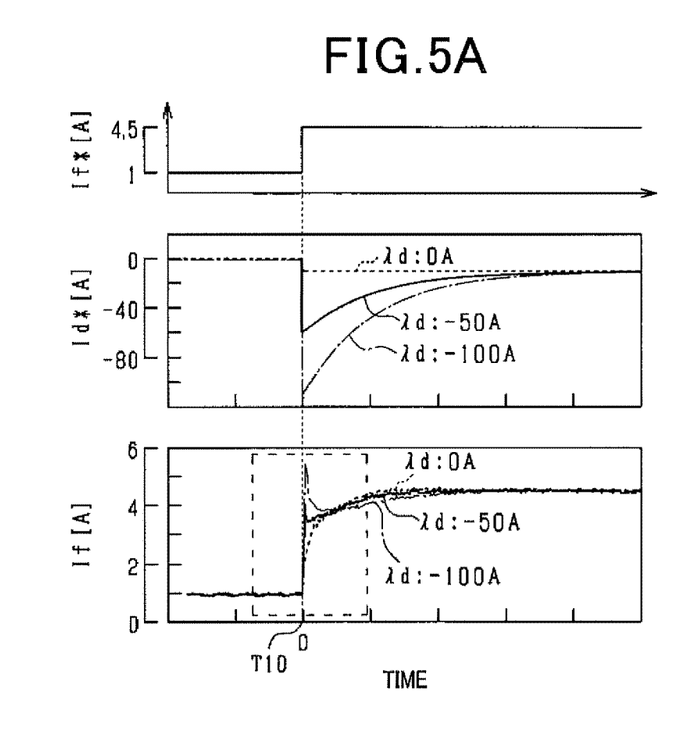
FIG. 5A and FIG. 5B are timing charts showing a change of the field current with time in the rotating electrical machine shown in FIG. 1.
Figure 5B:
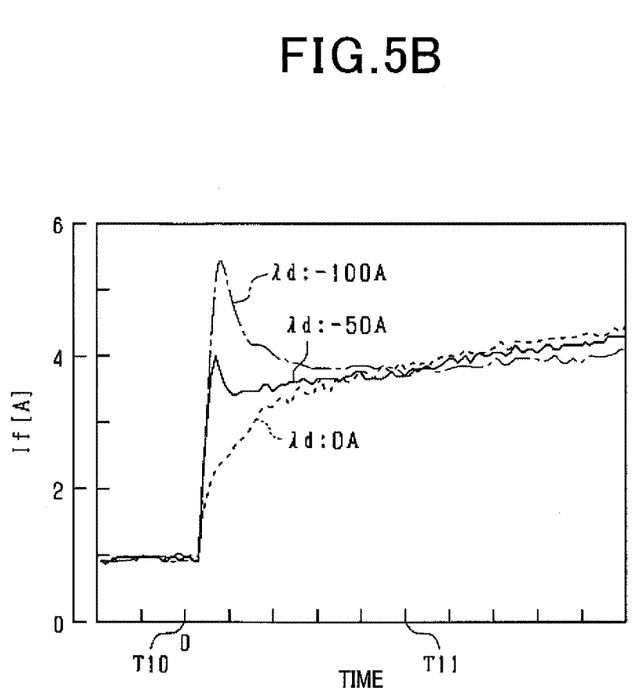

FIG. 5A and FIG. 5B are timing charts showing a change of the field current If with time in the rotating electrical machine 10 shown in FIG. 1. That is, the timing charts shown in FIG. 5A and FIG. 5B represent a responsiveness of the field current If when the step function has a different amplitude λd.

As shown in FIG. 5A and FIG. 5B, the amplitudes λd of the step function have been determined on the basis of the condition A: 0 A (designated by the dotted line), the condition B: −50 A (designated by the solid line), and the condition C: −100 A (designated by the long dashed short dashed line).

The condition A corresponds to a conventional control which does not perform the electromagnetic induction control of the field winding 12 by using the d-axis current Id. The rotating electrical machine 10 rotates at a constant rotation speed of 100 rpm.

At the time T10 shown in FIG. 5A and FIG. 5B, the control device 40 changes the field current instruction value If* to 4.5 A from 1.0 A according to the change of the torque instruction value T*.

After the time T10, the control device 40 changes the field current instruction value If* to −10 A according to the increasing of the torque instruction value T*. Further, the control device 40 changes the field current instruction value If* to −60 A by adding the step function under the condition B, and to −110 A by adding the step function under the condition C.

Under both the condition B and the condition C, because the d-axis current is increased rapidly, the induced current ΔIf is generated and the field current If is increased rapidly. After this, the control device 40 increases the d-axis current instruction value Id*. This control makes it possible to generate the induced current ΔIf in the direction opposite to the field current If by the d-axis current Id. However, because the d-axis current instruction value Id* is attenuated exponentially, it is possible to suppress the influence caused by the decreasing of the field current If when compared with the increasing of the field current If caused by the induced current ΔIf generated when the d-axis current Id is increased sharply.

As shown in FIG. 5A and FIG. 5B, the comparison results of the waveforms under the conditions B and C indicate that the more the amplitudes λd of the step function increases, the more the responsiveness of the field current If increases. The more the amplitudes λd of the step function increases, the more the deceleration of the d-axis current instruction value Id* increases, and the more the induced current ΔIf in the direction (in the negative direction), which is opposite to the direction of the field current If, increases. As a result, after the time T11 elapsed from the time T10, the field current If under the condition C is slightly smaller than the field current If under the condition B.

Figure 6A:
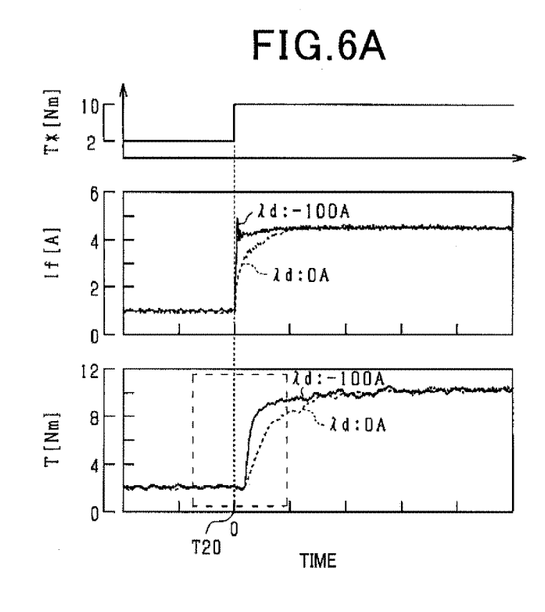
FIG. 6A and FIG. 6B are timing charts showing a change of an output torque of the rotating electrical machine with time.
Figure 6B:
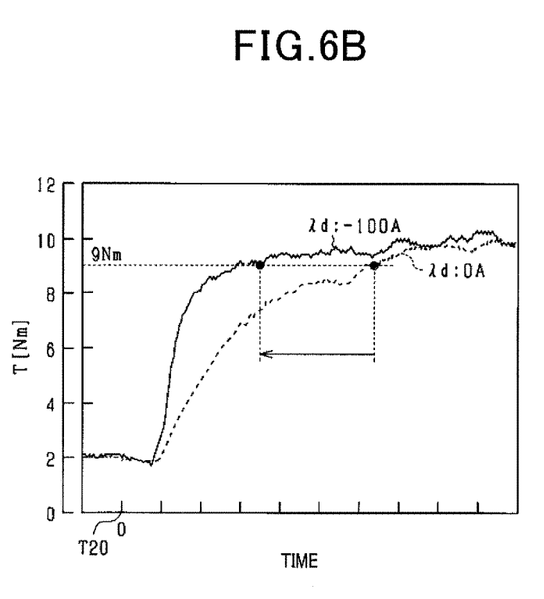

FIG. 6A and FIG. 6B are timing charts showing a change of the output torque of the rotating electrical machine 10 with time when electromagnetic induction is caused by using the d-axis current Id designated by the solid line and no electromagnetic induction occurs as designated by the dotted line. The amplitudes λd of the step function is −100 A in the cases shown in FIG. 6A and FIG. 6B.

At the time T20 shown in FIG. 6A, the torque instruction value T* is increased to 10 Nm from 2 Nm. The more the torque instruction value T* is increased, the more the field current instruction value If* is increased. After the increasing of the field current If caused by the increasing of the field current instruction value If*, the d-axis current Id flows. That is, when the d-axis current Id flows, the induced current ΔIf is generated. Accordingly, it can be understood that the field current If is increased sharply when electromagnetic induction is caused by using the d-axis current Id when compared with the case without electromagnetic induction of the d-axis current Id.

The sharp increasing of the field current If makes it possible to increase the responsiveness of the output torque T of the rotating electrical machine 10. Specifically, as shown in FIG. 6B, it is possible to decrease the rising time period of the output torque T of the rotating electrical machine 10 to a half value thereof when electromagnetic induction is performed by using the d-axis current Id as compared with the case when no electromagnetic induction is performed by using the d-axis current.

Figure 7A:
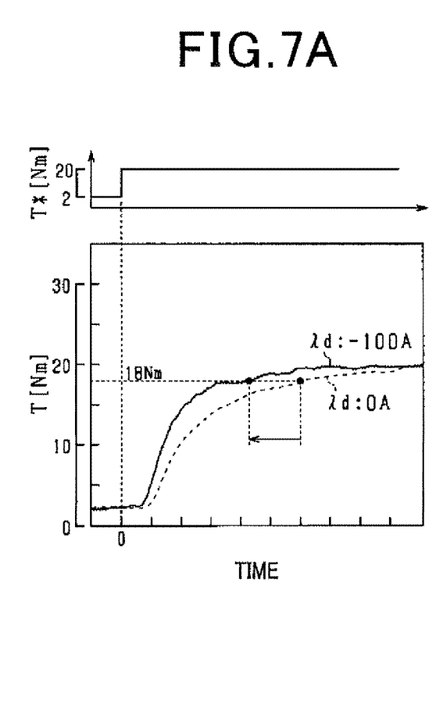
FIG. 7A, FIG. 7B and FIG. 7C are timing charts showing a change of an output torque of the rotating electrical machine with time on the basis of different torque instructions.
Figure 7B:
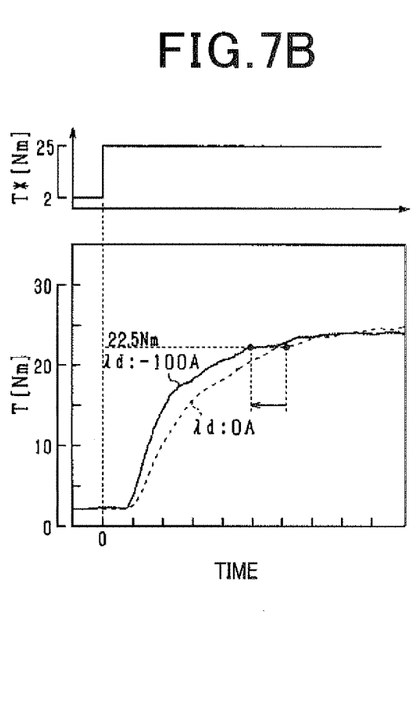
Figure 7C:
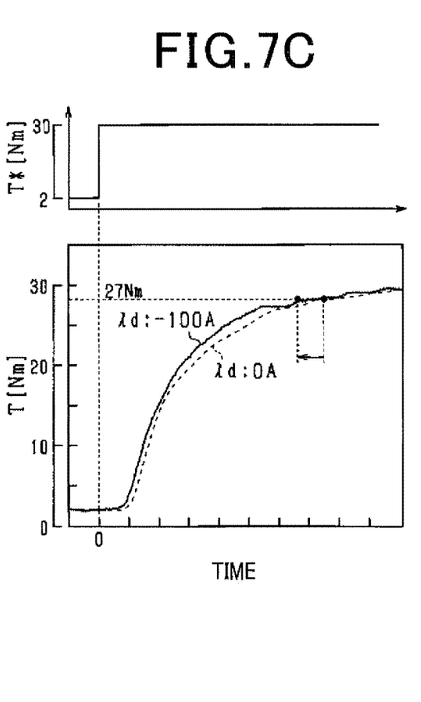

FIG. 7A, FIG. 7B and FIG. 7C are timing charts showing a change of the output torque T of the rotating electrical machine 10 with time on the basis of different torque instructions.

FIG. 7A shows a case when the torque instruction value T* is changed from 2 Nm to 20 Nm. FIG. 7B shows a case when the torque instruction value T* is changed from 2 Nm to 25 Nm. FIG. 7C shows a case when the torque instruction value T* is changed from 2 Nm to 30 Nm.

In the case shown in FIG. 7A, the duration, which is required for the output torque T of the rotating electrical machine 10 to reach 90 percent (18 Nm) of the torque instruction value T*, is reduced to approximately 70 percent. In the case shown in FIG. 7B, the duration, which is required for the output torque T of the rotating electrical machine 10 to reach 90 percent (22.5 Nm) of the torque instruction value T*, is reduced to approximately 80 percent. In the case shown in FIG. 7C, the duration, which is required for the output torque T of the rotating electrical machine 10 to reach 90 percent (28 Nm) of the torque instruction value T*, is reduced to approximately 85 percent. Even if the torque instruction value T* is increased, it is possible for the rotating electrical machine 10 to have improved torque responsiveness by the control device 40 according to the exemplary embodiment having the structure previously described.

A description will now be given of the effects of the control device 40 according to the exemplary embodiment having the structure previously described.

When the field current If is increased, the control device 40 increases the d-axis current Id in the direction to generate the d-axis magnetic flux Φd in the direction opposite to the direction of the magnetic flux Φa caused by the field current If. This generates the induced current ΔIf in the same as the direction of the field current If. Further, because the control device 40 starts to output the d-axis current Id after the increasing of the field current If, it is possible for all of the increased amount of the d-axis current Id to promote the rising of the field current If.

Because the d-axis current Id has only a small effect on the output torque T of the rotating electrical machine 10, the continuous flow of the d-axis current Id causes wastage of electrical power. The reduction of the d-axis current after the increase thereof can reduce wastage of electrical power. When the d-axis current Id is reduced after the d-axis current Id being increased, the field current If is reduced by the induced current ΔIf. There is a problem of reducing the responsiveness of the field current If when the field current Id being reduced. In order to avoid this problem, the control device 40 according to the exemplary embodiment gradually reduces the d-axis current Id. This makes it possible to suppress the decreasing of the field current If by the induced current ΔIf, and the reduction of the responsiveness of the field current If.

The stepwise increasing of the d-axis current Id allows the induced current ΔIf to be generated in the field winding 12 with high efficiency. Further, the exponential attenuation of the d-axis current Id makes it possible to suppress the field current If from decreasing accompany with the reduction of the d-axis current Id.

Specifically, the control device 40 according to the exemplary embodiment generates a step function signal, and supplies the step function signal to the high pass filter 44. The control device 40 adds a value outputted from the high pass filter 44 and the d-axis current reference value Id_b to generate the d-axis current instruction value Id*. The control device 40 having the improved structure previously described makes it possible to sharply increase the d-axis current Id stepwise, and exponentially attenuate the d-axis current Id immediately after the sharp increasing of the d-axis current Id. This makes it possible to suppress a current which does not contribute the increasing of the output torque of the rotating electrical machine 10.

Still further, the control device 40 according to the exemplary embodiment gradually reduces the d-axis current Id over a long period of time by using the time constant of the field winding 12. This control makes it possible to correctively reduce the d-axis current Id without obstructing the approach of the field current If to its target value.

In the structure of the control system having the control device 40 shown in FIG. 1, the direct current power source 21 supplies the same electric power to both the field winding 12 through the field current output section 22 and the armature winding 14 through the inverter 30. The output of the inverter 20 may drop due to a voltage drop of the direct current power source 21 caused when a large d-axis current Id flows. In order to avoid this problem, the control device 40 according to the exemplary embodiment reduces the d-axis current after the d-axis current Id being increased. This control makes it possible to suppress the phenomenon in which voltage drop of the direct current power source 21 occurs when the d-axis current Id is sharply increased, and field current If is reduced by this voltage drop of the direct current power source 21, and the reduction of the responsiveness of the field current If occurs by the decreasing of the field current If.

(Other Modifications)

A description will now be given of various modifications of the control device 40 according to the exemplary embodiment. As shown in FIG. 7A, FIG. 7B and FIG. 7C, under a condition in which the amplitude λd of the step function has a constant value, the more the torque instruction value T*, i.e. the field current instruction value If* is more increased, the improved response speed of the output torque T of the rotating electrical machine 10 is more reduced, i.e. the less good is the effect of the invention.

Further, as shown in FIG. 5A and FIG. 5B, when the control device 40 increases the amplitude λd of the step function, the induced current ΔIf increases more. This control can obtain the effect caused by the improvement of the responsiveness of the field current If. Still further, in the case in which the field current If and the armature currents Id and Iq are generated by the same amount of electric power supplied by the direct current power source 21, the voltage drop occurs in the direct current power source 21 by the armature currents Id and Iq when the d-axis current Id is excessively increased. This reduces the responsiveness of the field current If because the field current If decreases.

In order to avoid this problem, it is possible for the PI (proportional integral) calculation section 42 shown in FIG. 4 to have a modified structure in which the PI calculation section 42 adjusts an increased amount of the d-axis current Id on the basis of the magnitude of the field current instruction value If*. For example, in the case in which the armature currents Id, iq provides a small influence to the voltage drop of the direct current power source 21, the more the field current instruction value If* is large, the more the increased amount of the d-axis current Id is increased. Specifically, it is possible for the control device 40 to adjust the amplitude λd of the step function. This control makes it possible to improve the responsiveness of the field current If with high efficiency when the field current If changes.

In the exemplary embodiments and the modifications thereof, the control device 40 increases the d-axis current Id stepwise. However, the concept of the present invention is not limited by this. For example, it is acceptable for the control device 40 to increase the d-axis current Id by an n-order function (n is an integer of not less than one, i.e. n>=1) or exponentially increase the d-axis current Id.

In the exemplary embodiments and the modifications thereof, the control device 40 reduces the d-axis current instruction value Id* immediately after increasing the d-axis current instruction value Id*. However, the concept of the present invention is not limited by this. For example, it is acceptable for the control device 40 to adjust the d-axis current instruction value Id* to a constant value for a predetermined period of time after increasing the d-axis current instruction value Id*.

Still further, in the exemplary embodiments and the modifications thereof, the control device 40 exponentially attenuates the d-axis current instruction value Id* after the increasing of the d-axis current instruction value Id*. However, the concept of the present invention is not limited by this. For example, it is acceptable for the control device 40 to reduce the d-axis current instruction value Id* by a linear function.

In the exemplary embodiments and the modifications thereof, the control device 40 uses the direct current power source 21 which supplies the electric power to both the field winding 12 and the armature winding 21 in order to flow the field current If in the field winding 12 and the armature currents Id, iq in the armature winding 21. However, the concept of the present invention is not limited by this. For example, it is acceptable for the control device 40 to use different electric power sources, one electric power source supplies electric power to the field winding 21 only, and the other electric power source supplied electric power to the armature winding 21 only.

It is acceptable to use the high pass filter 44 having the time constant τ which is smaller than the time constant of the field winding 12.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device for a rotating electrical machine, the rotating electrical machine comprising a rotor and a stator, the rotor comprising a field winding and the stator comprising an armature winding, the control device capable of adjusting a field current flowing in the field winding and an armature current flowing in the armature winding, wherein when the armature current flowing in the armature winding is expressed by using a current vector comprised of a d-axis current and a q-axis current in a d-q coordinate system, in a case in which the field current starts to increase due to increasing of the torque instruction value to be supplied to the rotating electrical machine, the control device gradually reduces the d-axis current during a predetermined period of time after increasing the d-axis current in the direction to generate the field current, which is opposite from a direction to generate a magnetic flux by the field current,
the control device executes an exponential attenuation of the d-axis current during the predetermined period of time in order to gradually reduce the d-axis current.

2. The control device according to claim 1, the control device increases the d-axis current stepwise in a direction to generate the magnetic flux, which is opposite from the direction of the magnetic flux generated in the field winding.

3. The control device according to claim 2, wherein the control device calculates a d-axis current instruction value by adding a d-axis current reference value and a value which is obtained by passing a step function value through a high pass filter having a time constant, and adjusts the d-axis current on the basis of the calculated d-axis current.

4. The control device according to claim 1, wherein the control device uses the predetermined period of time which is longer than a time constant of the field winding when reducing the d-axis current.

5. The control device according to claim 1, wherein a direct current power source supplies electric power both to the field winding and the armature winding.

6. The control device according to claim 1, wherein the control device adjusts an increased amount of the d-axis current on a basis of a field current instruction value, where the field current flowing in the field winding is adjusted to approach the field current instruction value.

7. A control device, for a rotating electrical machine, the rotating electrical machine comprising a rotor and a stator, the rotor comprising a field winding and the stator comprising an armature winding, and the control device capable of adjusting a field current flowing in the field winding and an armature current flowing in the armature winding,
wherein when the armature current flowing in the armature winding is expressed by using a current vector comprised of a d-axis current and a q-axis current in a d-q coordinate system, in a case in which the field current starts to increase due to increasing of the torque instruction value to be supplied to the rotating electrical machine, the control device gradually reduces the d-axis current during a predetermined period of time after increasing the d-axis current in the direction to generate the field current, which is opposite from a direction to generate a magnetic flux by the field current, and
the control device executes a stepwise increasing of the d-axis current in a direction to generate the magnetic flux, which is opposite from the direction of the magnetic flux generated in the field winding.

8. The control device according to claim 7, wherein the control device calculates a d-axis current instruction value by adding a d-axis current reference value and a value which is obtained by passing a step function value through a high pass filter having a time constant, and adjusts the d-axis current on the basis of the calculated d-axis current.

9. The control device according to claim 7, wherein the control device uses the predetermined period of time which is longer than a time constant of the field winding when reducing the d-axis current.

10. The control device according to claim 7, wherein a direct current power source supplies electric power both to the field winding and the armature winding.

11. The control device according to claim 7, wherein the control device adjusts an increased amount of the d-axis current on a basis of a field current instruction value, where the field current flowing in the field winding is adjusted to approach the field current instruction value.

* * * * *